(12) United States Patent
Matsui et al.

(10) Patent No.: US 6,504,691 B1
(45) Date of Patent: Jan. 7, 2003

(54) SAFETY ENHANCED TRANSFORMER CIRCUIT

(75) Inventors: Yoshihiro Matsui, Motosu-gun (JP); Hideki Shimizu, Motosu-gun (JP)

(73) Assignee: Kabushiki Kaisha Sanyo Denki Seisa Kusho, Gifu (JP)

( * ) Notice: Subject to any disclaimer, the term of this patent is extended or adjusted under 35 U.S.C. 154(b) by 11 days.

(21) Appl. No.: 09/613,734

(22) Filed: Jul. 11, 2000

(30) Foreign Application Priority Data

Jul. 13, 1999 (JP) ............................................. 11-198507
Jul. 21, 1999 (JP) ............................................. 11-205675
Mar. 10, 2000 (JP) ....................................... 2000-066625

(51) Int. Cl.[7] ............................................... H02H 7/00
(52) U.S. Cl. ............................... 361/38; 361/42; 361/45
(58) Field of Search .............................. 361/42, 45, 48, 361/115, 38

(56) References Cited

U.S. PATENT DOCUMENTS 4,882,522 A * 11/1989 Brown ........................ 315/119

* cited by examiner

*Primary Examiner*—Stephen W. Jackson
(74) *Attorney, Agent, or Firm*—Connolly Bove Lodge & Hutz LLP

(57) ABSTRACT

A neon transformer includes secondary windings 16 and 17, and a junction 20 therebetween is connected through a voltage detection circuit 41 to a ground terminal 18 of the transformer. A resistive element 54 is connected in shunt with the voltage detection circuit 41. The voltage detection circuit 41 may comprise a series circuit of a Zener diode 52 and a light emitting element 53L of a photocoupler, for example. When a ground fault occurs on the secondary side of the transformer, the location of the ground fault assumes a reference potential, whereby the potential of the junction 20 rises to cause a current flow through the Zener diode 52 and the light emitting element 53L, which renders a light receiving element 53P conductive to pass an energizing current through a relay drive coil 34, thus throwing a relay contact switch 13 from NC to NO, thus interrupting the supply of the a.c. power.

18 Claims, 10 Drawing Sheets

SAFETY ENHANCED TRANSFORMER CIRCUIT

FIELD OF THE INVENTION

The present invention relates to a safety-enhanced protective circuit for a neon transformer which is used to energize a neon tube or an argon tube for illumination.

BACKGROUND OF THE INVENTION

FIG. 1 shows a conventional circuit of the kind which detects a ground fault of a neon transformer. A leakage transformer (non transformer) 11 includes a primary winding 12 having one connected through a switch 13 to an input terminal 14 and the other end connected to an input terminal 15. The transformer also includes a pair of secondary windings 16, 17 having their starting ends connected together at a junction 20 which is connected to a ground terminal 18 of a transformer casing 36, and which thus is connected to the casing 36. The ground terminal 18 is connected to the ground and the both terminals ends of the secondary windings 16, 17 are connected to output terminals 21, 22, across which sign lamps 23 such as neon tubes or argon tubes are connected. An alternating current power or commercial power is input across the input terminals 14, 15 and is boosted by the transformer 11 to be applied across the sign lamps 23 for lighting them.

A protective circuit 10 is provided to detect any ground fault, namely, a contact of the sign lamps 23 or their wirings with the casing 36 or a tower on which the sign lamps 23 are mounted and to interrupt the input a.c. power in such event. Specifically, tertiary windings 25, 26 are provided in the vicinity of the secondary windings 16, 17 and are magnetically coupled therewith , and function as part of the protective circuit 10. Usually the tertiary windings 16, 17 are disposed so as to be interposed between the core on which the secondary windings 16, 17 are disposed and the lowermost layer of the secondary windings 16, 17 with a layer of an insulation material having a high withstand voltage capability on the order of 6000 to 7000 V interposed between the secondary windings 16 and 17 and the tertiary windings 25, 26 to provided an enhanced electrical insulation therebetween while assuring a satisfactory magnetic coupling between the secondary windings 16, 17 and the tertiary windings 25, 26.

At one end, each of the tertiary windings 25, 26 is connected together in phase opposition such that their induced voltages cancel each other while the other end of respective tertiary winding 25, 26 is connected to an input of a rectifying and smoothing circuit 27, an output of which is connected through a Zener diode 28 across a parallel circuit including a resitor 31 and a cpacitor 32. A triac 33 has its gate and cathode connected across the parallel circuit. The triac 33 is connected in series with a relay drive coil 34 across the input terminals 14, 15 and the switch 13 comprises a relay contact which is controlled in accordance with the energization of the relay drive coil 34.

Under a normal condition, voltages induced across the teritary windings 25, 26 are substantially equal in magnitude to each other, but are opposite in phase, whereby an input voltage to the recitifying and smoothing circuit 27 is nearly zero. However, upon a ground fault of the sign lamps 23 or the wiring thereof, one of the secondary windings which is associated with the ground fault will be short-circuited, causing a substantial decrease in the induced voltage in the teritiary winding which is coupled with this secondary winding to allow the full induced voltage in the other teritary winding to be applied to the rectifying and smoothing circuit 27. This voltage is rectified and smoothed, and an increase in the rectified and smoothed output voltage turns Zener diode 28 on, with consequence that the triac 33 is rendered on to energize the relay drive coil 34 to open the switch 13, thus interrupting the supply of the input a.c. power to the transformer 11. The switch 13 comprising the relay contact is thrown to the normally open position NO, whereby the holding current to the relay drive coil 34 flows therethrough.

It will be noted that in the described conventional circuit, the pair of tertiary windings are used and disposed below (or inside) the lowermost layer of the pair of secondary windings with a high withstand voltage insulation. The provision of the tertiary windings requires time and labor, reducing the production efficiency of the neon transformer.

Protection against a secondary ground fault of such a neon transformer is also disclosed in FIG. 3 of U.S. Pat. No. 5,847,909 issued Dec. 8, 1998, where the protective circuit does not employ a tertiary winding, but uses an increased number of parts and results in a complicated arrangement, which renders it difficult to utilize a conventional box for containing a neon transformer.

For a neon transformer, it is mandated by legal regulation that the ground terminal 18 be always connected to the ground for use in views of the safety consideration. However, there is a likelihood that a dealer who undertakes constructing a neon tower which uses neon lamps may forget the work of connecting the ground terminal 18 to the ground. A no-ground connection protective circuit which detects such condition during use to interrupt the supply of the a.c. power is proposed and shown in FIG. 2 of the U.S. Patent cited above. However, this no-ground connectin protective circuit again requires an increased number of parts and results in a complicated arrangement, rendering it difficult to utilize a conventional box for containing a neon transformer.

The ground fault protective circuit shown in FIG. 1 detects any ground fault which occurs on the secondary side of the neon transformer immediately to interrupt the supply of the a.c. power to the transformer, and thus is free from any likelihood of causing a fire. However, it is necessary to repair a location where the ground fault has occurred . It will be understood that finding the location of the ground fault is an awful burden for a neon tower of an increased size, for example. If a ground fault causes a ground current to flow to produce sparks, the location of the ground fault may be discovered in a relatively simple manner by relying on light produced or a smell of ozone generated by sparks. However, with the ground fault protective circuit shown in FIG. 1, when a power switch, not shown, is turned off to interrupt the supply of the a.c. power to the input terminals 14, 15 and thus to interrupt the self-holding current to the relay drive coil 34, and the switch is restored to its normally closed position NC before reclosing the power switch, the ground current again flows through the location of the ground fault, which is immediately detected by the ground fault protective circuit 10 to throw the switch 13 to the normally open position NO, interrupting the supply of the a.c. power for the second time. Accordingly, the reclosing of the power switch fails to produce a ground fault condition in order to discover the location of the ground fault. This takes time to identify the location of the ground fault, preventing a repair from being completed rapidly. The same is true with the ground fault protective circuit disclosed in the cited Patent.

It is an object of the invention to provide a no-ground connection protective circuit for a neon transformer which employs a reduced number of parts and a simple arrangement to be capable of detecting a secondary ground fault to interrupt the supply of the a.c. power.

It is another object of the invention to provide a ground fault protective circuit for an neon transformer which temorarily overrides the function of the ground fault protective circuit to enable the discovery of the location of a ground fault to be facilitated.

It is a further object of the invention to provide a no-ground connection protective circuit which employs a reduced number of parts and a simple arrangement to provide a protection against no ground connection of a ground terminal.

SUMMARY OF THE INVENTION

A ground fault protective circuit according to the present invention comprises a ground fault voltage detection circuit which detects a voltage equal to or above a given voltage which occurs between a midpoint on a secondary winding of a neon transformer and a ground terminal and a power supply interruption controller which responds to a detection output from the ground fault voltage detection circuit by interrupting the supply of an a.c. power to the transformer.

The ground fault protective circuit of the invention further comprises a ground fault protection stop switch, which overrides the function of the ground fault protective circuit by means of a ground fault protection stop circuit when operated.

With a no-ground connection protective circuit of the invention, a voltage between a non-active line input terminal and a ground terminal is detected, when it is equal to or above a given value, by a no-ground connection voltage detection circuit, and the supply of the a.c. power to the primary winding is interrupted by a power supply interruption controller in response to the voltage detection output.

According to another aspect of the no-ground connection protective circuit of the invention, the application of the power between an active line input terminal and a non-active line input terminal is detected by a power application detection circuit, which is connected in shunt with a switching element. A no-ground connection voltage detection circuit is connected between the active line input terminal and the ground terminal and detects a potential difference between the active line input terminal and the ground terminal to turn the switching element on to override the power application detection circuit. If the power application detection circuit detects the application of the power, the supply of the a.c. power to the primary winding is interrupted by the current supply interruption controller.

DETAILED DESCRIPTION OF THE PREFFERED EMBODIMENTS

Figure 1:
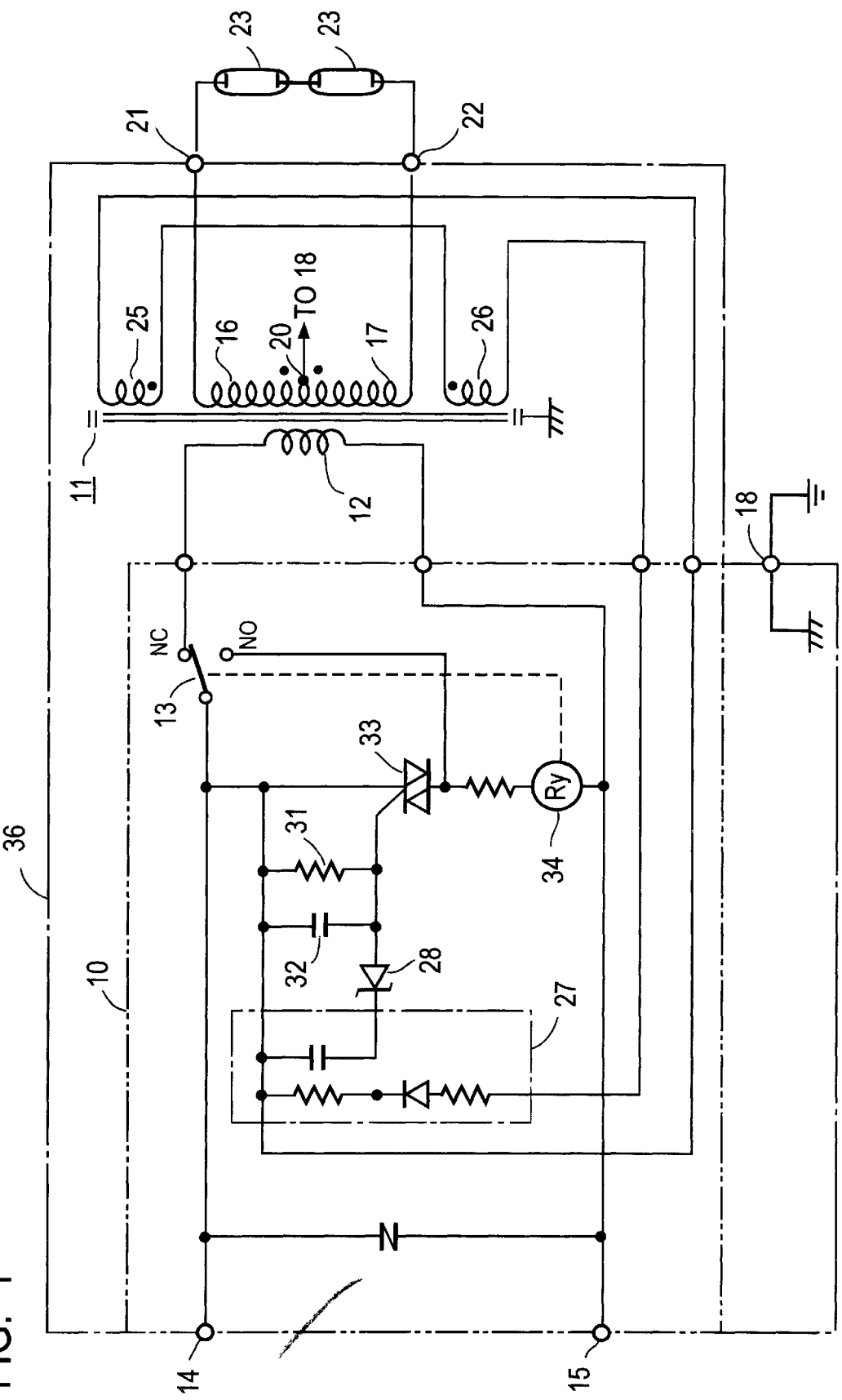
FIG. 1 is a circuit diagram of a conventional ground fault protective circuit.
Figure 2:
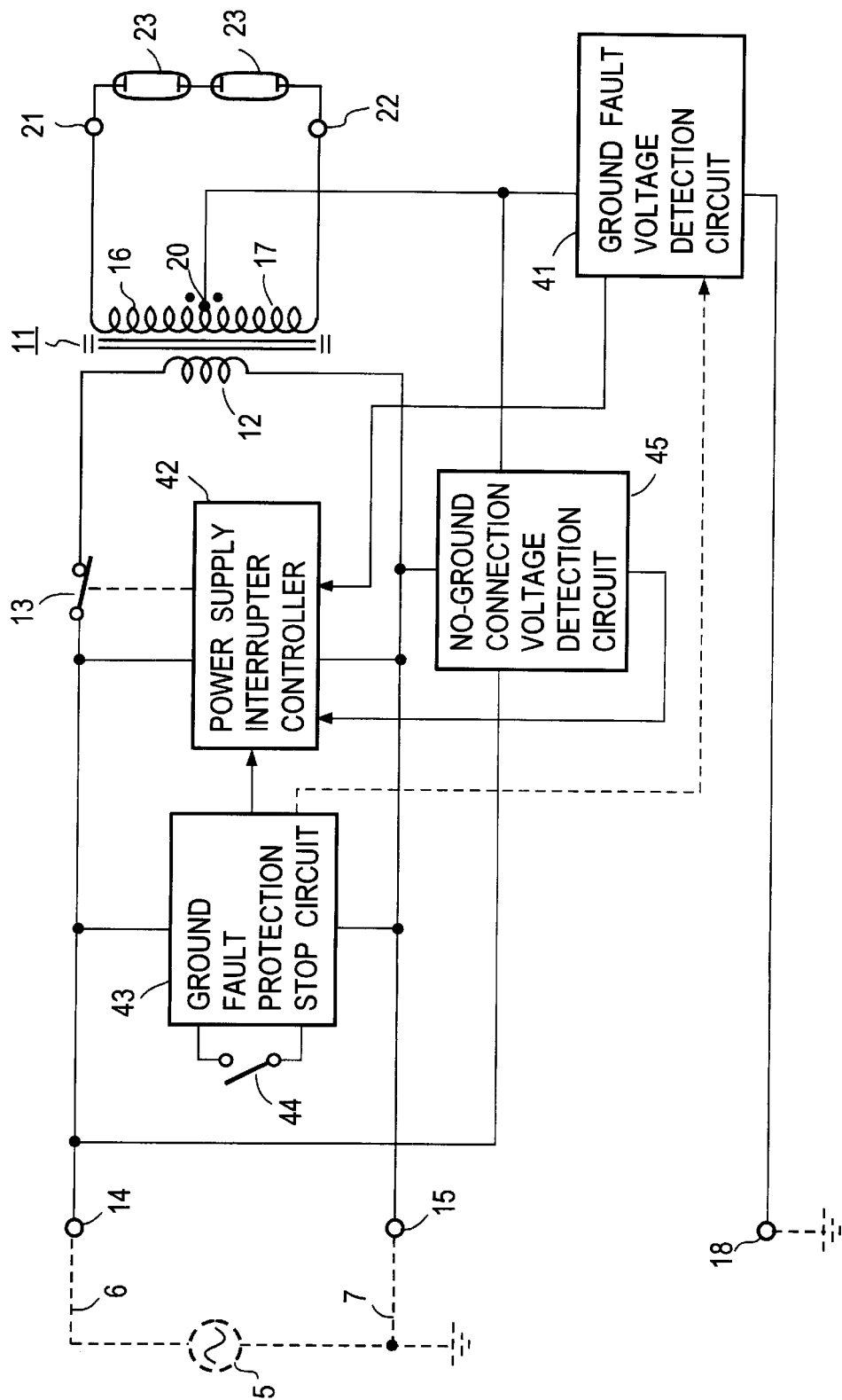
FIG. 2 is a circuit diagram showing an embodiment of a neon transformer with the protective circuit according to the invention.

FIG. 2 shows an embodiment illustrating the principle of the invention, and it is to be noted that corresponding parts to those shown in FIG. 1 are designated by like reference numerals as used before. An input terminal 14 represents an active line input terminal connected to an active line 6 of a commercial a.c. power supply 5 which is not grounded, and an input terminal 15 represents a non-active line input terminal connected to a non-active line 7 of the commercial supply 10 which is grounded.

A voltage detection circuit 41 is connected between a junction 20 between secondary windings 16 and 17 and a ground terminal 18, and in the event a ground fault occurs on the secondary side of the transformer 11, a voltage occurs between the junction 20 and the ground terminal 18 which exceeds a given value, and this is detected by the ground fault voltage detection circuit 41. A detection output from the detection circuit 41 controls a power supply interruption controller 42, which operates to turn a switch 13 off, whereby the supply of an a.c. to the transformer 11 is interrupted. Thus, the ground fault protective circuit is comprised of the ground fault voltage detection circuit 41 and the power supply interruption controller 42.

A ground fault protection stop circuit 43 is connected between the input terminals 14 and 15, and operates to stop the function of the ground fault protective circuit when a ground fault protection switch 44 provided in the ground fault protection stop circuit 43 is operated. Stopping the function may comprise stopping the function of the ground fault voltage detection circuit 41 or stopping the function of the power supply interruption controller 42. Preferably, the ground fault protection stop circuit 43 internally contains a timer so that when a given length of time passes after the switch 44 has been operated, the stop of the function applied to the ground fault protective circuit is automatically reset.

The transformer 11 is constructed so that induced voltages in the secondary windings 16 and 17 are slightly unbalanced. No-ground connection voltage detection circuit 45 is connected between the junction 20 between the secondary windings and the non-active line input terminal 15, and is fed with power from the input terminals 14 and 15 to operate in a manner such that when the a.c. power is supplied to the transformer 11 without connecting the ground terminal 18 to the ground, the voltage between the junction 20 and the non-active line input terminal 15 exceeds the given value and this is detected by the no-ground voltage detection circuit 45 to provide a detection output which controls the power supply interruption controller 42 so that it turns the switch 13 off. In this manner, the combination of the no-ground connection voltage detection circuit 45 and the power supply interruption 42 forms a no-ground terminal ground connection protective circuit. If a reverse connection is made such that the active line input terminal 14 is connected to the non-active line 7 while the non-active line input terminal 15 is connected to the active line 6, a voltage is developed between the terminal 15 and the ground terminal 18, and this voltage is detected by the no-ground connection voltage detection circuit 45 to provide a detection output which controls the power supply interruption controller 42 so that the switch 13 is turned off. In this manner, the combination of the no-ground connection voltage detection circuit 45 and the power supply interruption controller 42 also operates as a reverse connection protective circuit.

Figure 3:
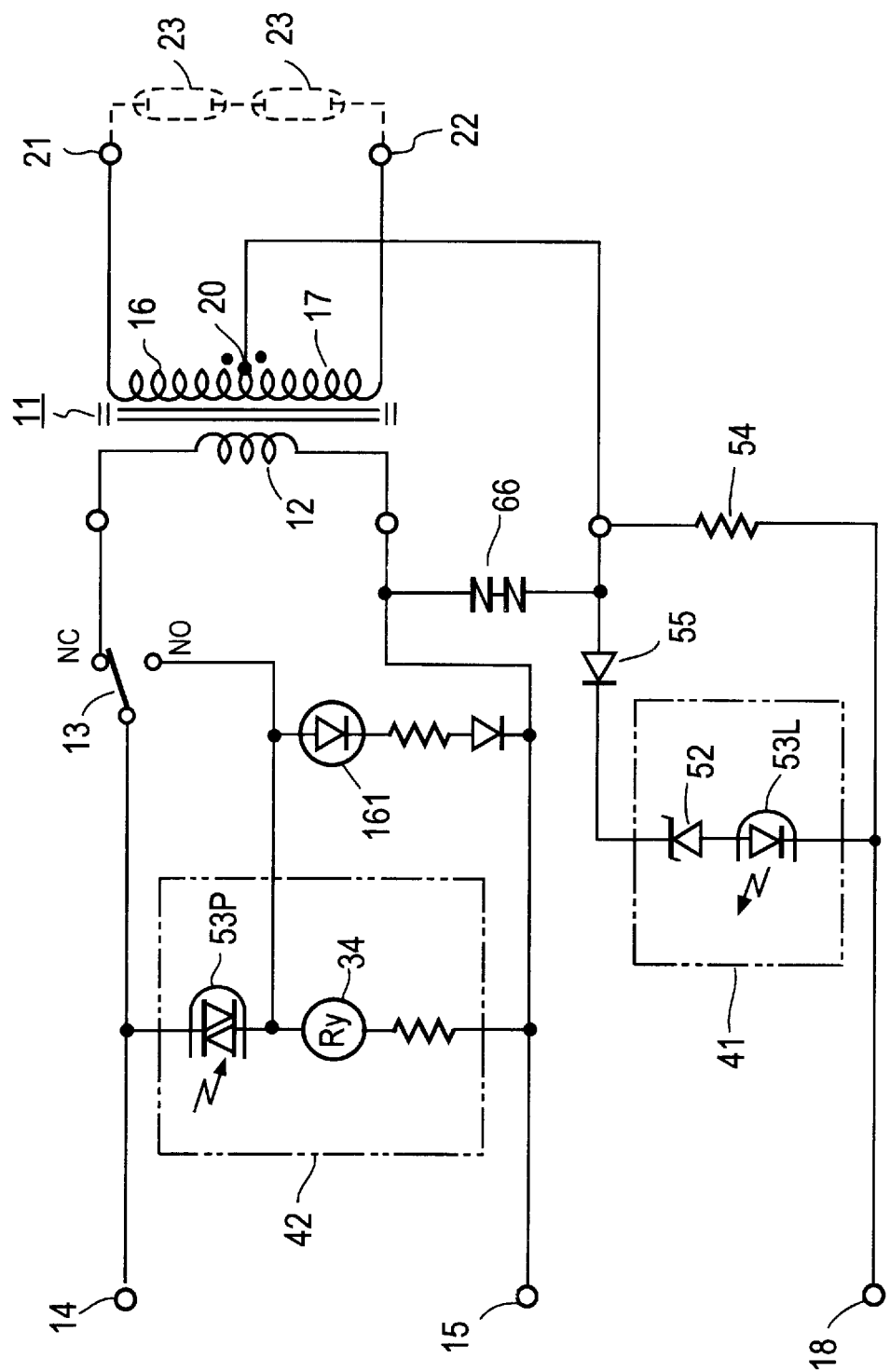
FIG. 3 is a circuit diagram showing the embodiment shown in FIG. 2 principally around the ground fault protective circuit.

FIG. 3 shows a fundamental arrangement of the ground fault voltage detection circuit 41 and a specific example of the power supply interruption controller 42, with corresponding parts to those shown in FIG. 1 being designated by like reference numerals and characters. The ground fault voltage detection circuit 41 comprises a series circuit of a Zener diode 52 acting as a threshold element and a light emitting element 53L for a photocoupler 53. In the present example, the ground fault voltage detection circuit 41 is connected in shunt with a resistive element 54 as required, with a rectifier diode 55 being connected in series with the ground fault detection circuit 41. To serve as the power supply interruption controller 42, a series circuit of light receiving element 53P of the photocoupler 53 and a relay drive coil 34 is connected between the input terminals 14 and 15. A contact 13 which is controlled by the relay drive coil 34 and its normally closed contact NC are connected between the input terminal 14 and the primary winding 12, and the normally open contact NO is connected through the relay drive coil 34 to the input terminal 15.

With the described arrangement, in the normal condition where there is no ground fault on the secondary side of the transformer 11, the junction 20 between the secondary windings 16 and 17 assumes a potential which is substantially equal to zero as is the voltage between the junction 20 and the ground terminal 18. Accordingly, no voltage is detected by voltage detection circuit 41. There is no current flow through the light emitting element 53L. Accordingly, a.c. power is supplied from the input terminals 14 and 15 to the primary winding 12.

If a ground fault occurs on the secondary side of the transformer, namely from neon lamp 23 or its wiring, which may be assumed as occurring on the side of an output terminal 21, the location of ground fault assumes a reference (or ground) potential, and accordingly, a secondary voltage induced across the secondary winding 16 appears at the junction 20, and such voltage causes the Zener diode 52 to conduct to cause the light emitting element 53L to emit light, whereby there occurs a current flow through the light receiving element 53P to pass an energizing current through the relay drive coil 34. This transfers the contact 13 to its normally open position NO, thus interrupting the supply of the a.c. power to the primary winding 12. A self-holding current flows through the relay drive coils 34. Thus, upon occurrence of a ground fault, this is detected by the ground fault voltage detection circuit 41 to interrupt the supply of the a.c. power to the primary winding 12, thus avoiding the occurrence of the fire as a result of continued current flow through the location of the ground fault.

In the event a ground fault which occurs on the secondary side of the transformer 11 causes a neutral point or the junction 20 to assume a high potential, which is applied through the photocoupler 53 (namely, through the path between the light emitting element 53L and the light receiving element 53P which are located close to each other) to the non-active line input terminal 15 of the commercial supply to destroy the photocoupler 53, a protective element 66 may be connected between the junction 20 and the input terminal 15 as shown in FIG. 3, so as to be rendered conductive to provide a protection for the photocoupler 53.

Figure 4A:
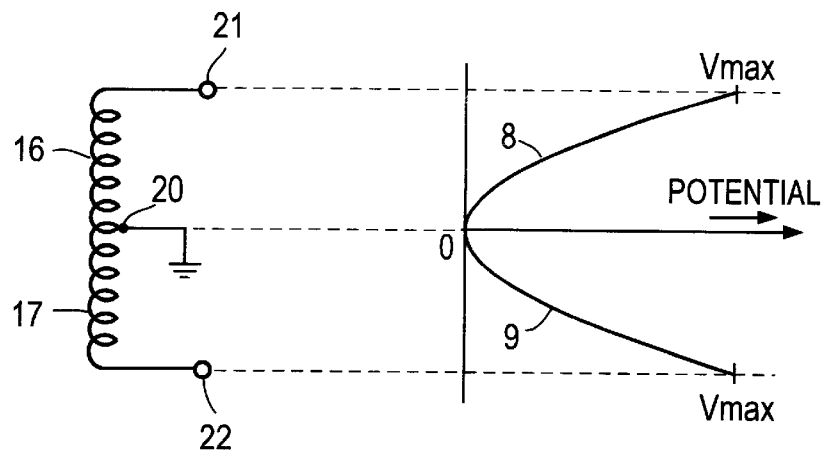
FIG. 4A is a plot showing an exemplary potential distribution of the secondary winding which is grounded at the midpoint.
Figure 4B:
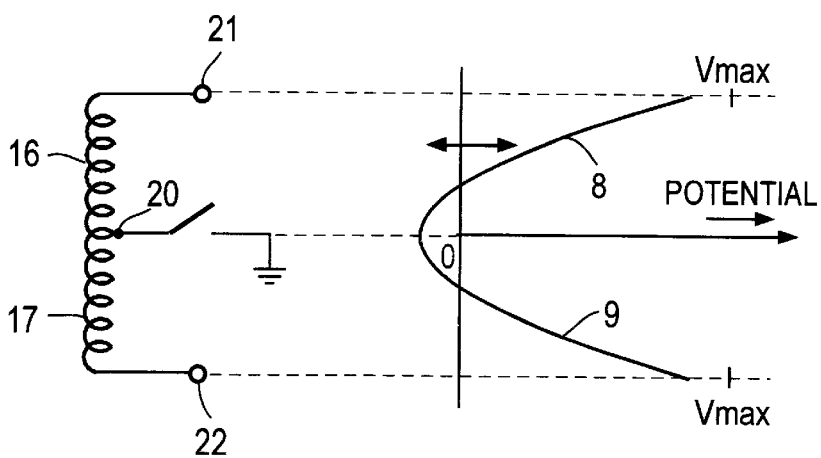
FIG. 4B is a plot showing an exemplary potential distribution of the secondary winding which is not grounded at the midpoint.
Figure 4C:
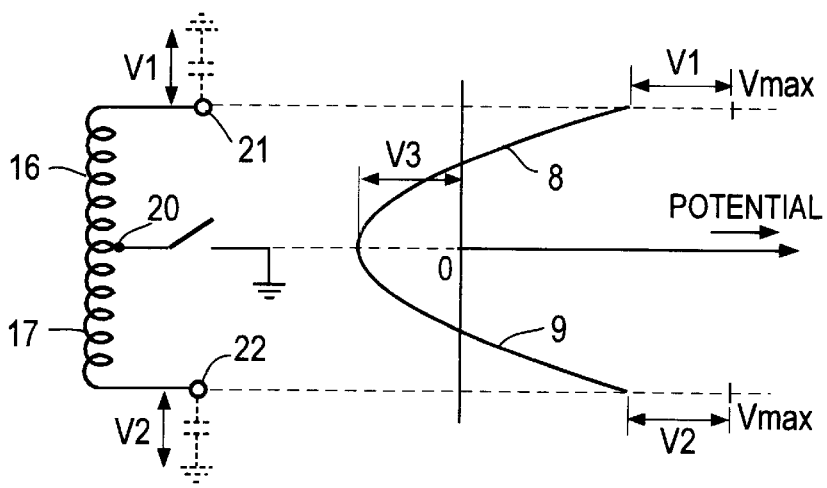
FIG. 4C is a plot showing an exemplary potential distribution of the secondary winding which is not grounded at the midpoint when a metal conduit is used for the wiring.

To prevent a fire from occurring, the secondary wiring may be passed through a flexible metal tube which is commonly referred to as a metal conduit. Because the metal conduit assumes the ground potential, there is a current flow, though of a very small magnitude, through a capacitance thereof to raise the potential of the junction 20 in the secondary winding. This will be discussed in more detail. When the junction 20 between the secondary windings 16 and 17 is connected to the ground as shown in FIG. 4A, the junction 20 assumes a reference potential ( or 0 potential), and the potential on the secondary windings 16, 17 will follow curves 8 and 9 to become a maximum at output terminals 21 and 22. When the junction 20 is disconnected from the ground as shown in FIG. 4B, a point of zero potential is not fixed, but moves along, whereby the potential on the secondary windings 16 and 17, as shown by curves 8 and 9, will fluctuate unstably along the potential axis. If the secondary wiring is passed through a metal conduit, the output terminals 21 and 22 will be connected to the ground through respective capacitances $C_{s1}$ and $C_{S2}$, passing a very small current flow to the ground through these capacitances, as shown in FIG. 4C. Accordingly, this is equivalent to saying that the output terminals 21 and 22 are connected to the ground (or a point of reference potential) through high impedance elements which comprises the capacitances $C_{S1}$ and $C_{S2}$, respectively, and thus the potentials at the output terminals 21 and 22 will be reduced, by an amount corresponding to respective voltage drops V1 and V2 across the capacitances $C_{S1}$, $C_{S2}$ below the maximum potential $V_{max}$ shown in FIG. 4A, whereby there results a potential V3 which corresponds to such reduction at the junction 20.

Accordingly, in this instance, even under a normal condition, a voltage having an absolute magnitude of the potential V3 is applied across the voltage detection circuit 41 which is connected between the junction 20 and the ground terminal 18, causing the voltage detection circuit 41 to detect such voltage even under a normal condition to cause a malfunctioning of the ground fault protective circuit. To prevent such malfunctioning from occurring, the resistive element 54 is connected with its resistance value being chosen such that under a normal condition, a voltage applied to the ground fault voltage detection circuit 41 is below a given value or so as to prevent the Zener diode 52 from conducting. In other words, the resistance of the resistive element 54 is chosen so that the current passing through the resistive element 54 is greater than the current flow through the capacitances $C_{S1}$ and $C_{S2}$, thus preventing the Zener diode 52 from conducting under the normal condition. If a ground fault occurs on the secondary side under this condition, the impedance which results from the capacitance $C_{S1}$ or $C_{S2}$ will be substantially equal to zero at the location of the ground fault, whereby a sufficient voltage is applied to the ground fault voltage detection circuit 41 to allow it to detect the ground fault, thus providing the ground fault protective function.

Figure 5:
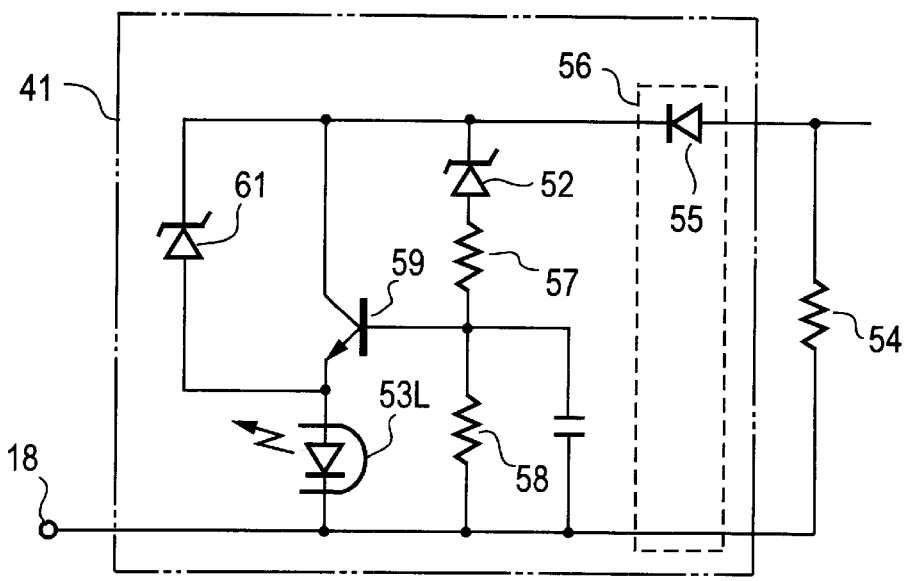
FIG. 5 is a circuit diagram showing an another example of the ground fault voltage detection circuit 41.

It is possible that a current to operate the light emitting element 53L reliably may be insufficient in the ground fault voltage detection circuit 41 shown in FIG. 3. To overcome this problem, it may be constructed in a manner as shown in FIG. 5, for example.

Specifically, a voltage across the resistive element 54 is rectified by a rectifier circuit 56 comprising a diode 55, and the rectified output may be applied to a series circuit comprising the Zener diode 52 acting as a thresholding element and resistive elements 57 and 58, and the rectified output is also applied to a series circuit including a transistor 59 and the light emitting element 53L, with the junction between the resistive elements 57 and 58 being connected to the base of the transistor 59. As required, a Zener diode 61 is connected across the collector and the emitter of the transistor 59 to protect the transistor 59.

As a voltage across the resistive element 54 exceeds a given value, the output from the rectifier circuit 56 renders the Zener diode 52 conductive, whereby a base current is supplied to the transistor 59 to render it conductive to allow the light emitting element 53L to emit light. The voltage at which the transistor 59 conducts is determined by the Zener diode 52 and the resistive elements 57 and 58.

Figure 6:
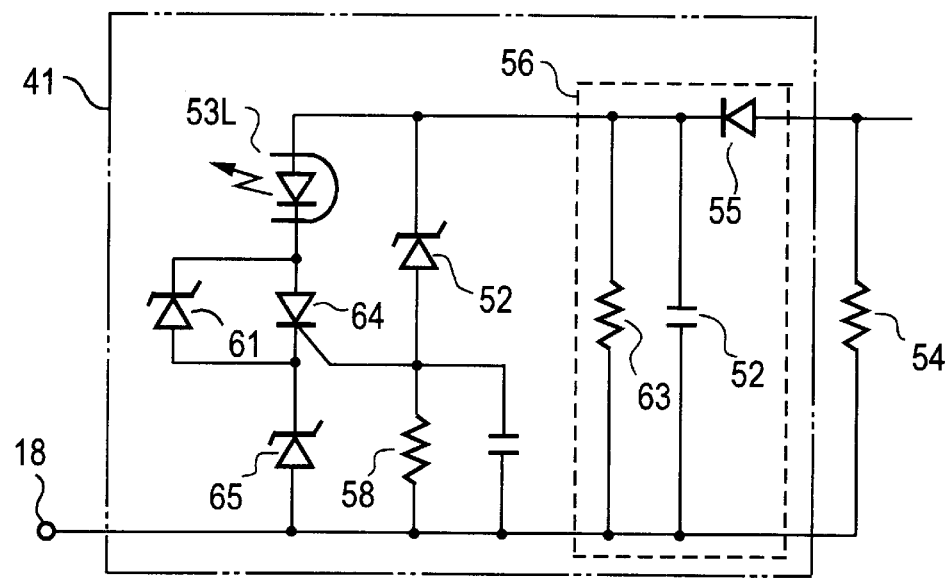
FIG. 6 is a circuit diagram showing a further example of the ground fault voltage detection circuit 41.

The ground fault voltage detection circuit 41 may be constructed as shown in FIG. 6. As shown, a smoothing circuit including a capacitor 62 and a resistive element 63 is provided within the rectifier circuit 56 so that the rectified output from the diode 55 is smoothed before being applied to the Zener diode 52. The transistor 59 may be replaced by a thyristor 64 acting as a switching element. In this instance, the light emitting element 53 L is preferably connected to the anode side rather than to the cathode side of the thyristor 64. Specifically, this is because when the light emitting element 53L is connected to the cathode of the thyristor 64 (or to the emitter when the transistor 59 is employed), a variation in the impedance of the light emitting element 53L causes a voltage at which the thyristor 64 (or the transistor 59) is turned on to change. The purpose of a Zener diode 65 connected to the cathode of the thyristor 64 is to prevent the thyristor 64 from conducting in response to noises, but such Zener diode may be omitted.

In the arrangement shown in FIG. 3, when the midpoint of the load (sign lamps 23) is connected to the ground, the detection of the secondary ground fault may be rendered difficult. For this reason, it is prescribed that the midpoint of the load be not connected to the ground. However, in the event the midpoint of the load is connected to the ground by a mistake of the work, the ground fault voltage detection circuit 41 and the power supply interruption controller 42 may be employed to stop the supply of the a.c. power to the primary winding 12, thus preventing a neon tower, for example, from operating.

At this end, the neon transformer 11 is constructed so that the voltages induced in the respective secondary windings 16 and 17 are unbalanced. For example, the pair of magnetic circuits, each of which comprises one of the secondary windings 16 and 17, may be constructed to be unbalanced. Specifically, referring to FIG. 7, the primary winding 12 is disposed centrally on a side of a rectangular frame-shaped magnetic core 71, and the secondary windings 16 and 17 are disposed on the core of 71 on the opposite sides of the primary winding 12. A pair of leakage cores 72 and 73 are provided in each space between the primary winding 12 and the secondary windings 16 and 17 to provide a magnetic shunt for the frame-shaped core. In the present embodiment, the leakage cores have different widths t1 and t2 so as to exhibit different flux leakage characteristics, thus providing magnetic circuits 74 and 75 each comprising one of the secondary windings 16 and 17 which are mutually unbalanced. By way of example, t1 may be by an amount corresponding to 10 to 30% of the width t of the frame-shaped core 71 reduced while t2 may be by an amount corresponding to 10 to 30% of t greater than the width t.

Figure 8:
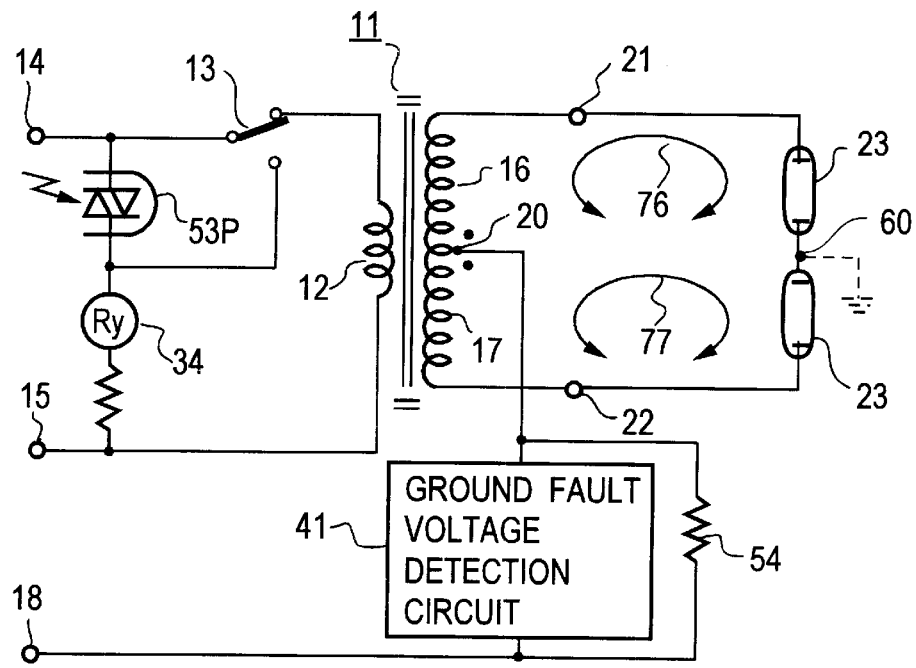
FIG. 8 is a circuit diagram showing an example of a ground fault protective circuit using the transformer shown in FIG. 7.

When the ground fault protective circuit shown in FIG. 3 is constructed using the neon transformer 11 thus constructed, there results an arrangement as shown in FIG. 8. In this arrangement, when the midpoint 60 of the load is not connected to the ground and under the normal condition, the potential at the junction 20 is substantially equal to zero, and the ground fault voltage detection circuit 41 does not detect a voltage. However, when the midpoint 60 of the load is connected to the ground as indicated by broken lines in FIG. 8, there are produced current flows 76 and 77 passing through the grounded point, the ground terminal 18 and each of the secondary windings 16 and 17. The magnitudes of such current flows 76, 77 are mutually different as a result of differential magnetic characteristics of the magnetic circuits 74 and 75 as mentioned above, whereby a differential current, which may be on the order of several mA's, passes between the junction 20 and the ground terminal 18 to be detected by the ground fault voltage detection circuit 41, which then operates the relay 34 to interrupt the supply of the a.c. power to the primary winding 12.

In addition to providing leakage cores 72 and 73 of different widths, individual air gaps may have different length G1 and G2 to provide different flux leakage characteristics for the leakage cores 72 and 73. Alternatively, both the widths t1 and t2 and the lengths G1 and G2 may be chosen to be different from each other. As a further alternative, the secondary windings 16 and 17 may have slightly different lengths, thus shifting the junction 20 from the neutral point. What is required is to provide mutually different characteristics for the magneteic circuits 74 and 75. However, if the magnetic circuits 74 and 75 are excessively unbalanced, the unbalance will influence upon the lighting response of the sign lamps. Therefore, it is required that the magnetic characteristics each formed by one of the secondary windings 16 and 17, be chosen to be in range on the order of ±10% to 30% with respect to the magnetic characteristic which is chosen to be equal for the conventional magnetic circuits 74 and 75.

Figure 7:
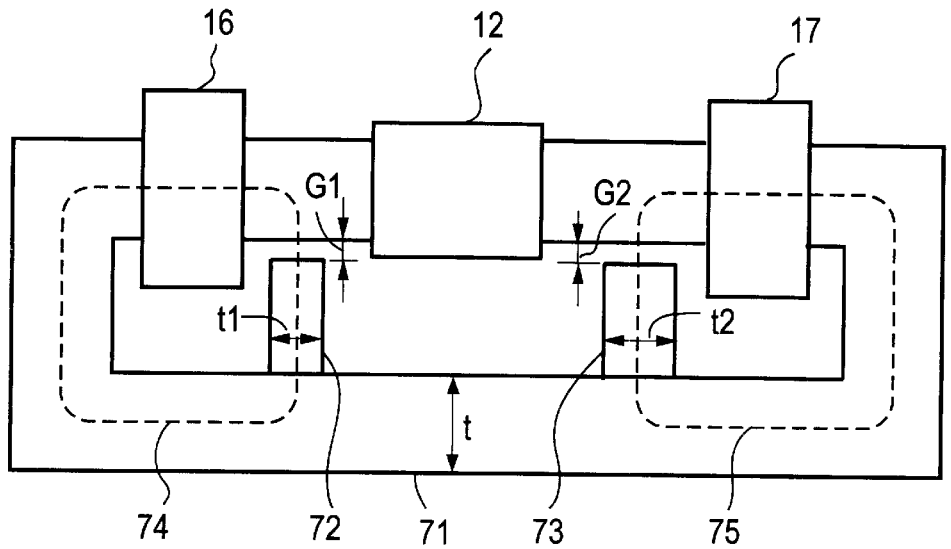
FIG. 7 shows a layout of an exemplary magnetic core of the transformer 11 when the magnetic circuits for the secondary windings 16 and 17 are unbalanced.

When the transformer 11 having unbalanced magnetic characteristics for the magnetic circuits 74 and 75 as shown in FIG. 7 is employed, in the ground fault protective circuit using the ground fault voltage detection circuit 41 which is constructed as shown in either FIG. 5 or 6, it will be readily seen that a ground connection of the midpoint 60 of the load causes the supply of the a.c. power to be interrupted and that a secondary ground fault is detected to interrupt the supply of the a.c. power. The supply of the a.c. power may be interrupted by using a semiconductor switching element such as triac, rather than using a relay.

With the ground fault protective circuit according to the present invention, a secondary ground fault can be detected with a simple arrangement and using a reduced number of parts without requiring the provision of tertiary windings on the neon transformer, thus interrupting the supply of the a.c. power. Accordingly, the manufacturing of the neon transformer is simplified than in the prior art, thus improving the productivity.

When the neon transformer is constructed so that the magnetic circuits formed by the pair of secondary windings are unbalanced as shown in FIG. 7, for example, the ground connection of the midpoint 60 on the load interrupts the supply of the a.c. power.

As mentioned above under the paragraph of the background of the invention, it takes a long time and much labor to find out the location of a ground fault under the condition that the ground fault protective circuit is operative.

Figure 9:
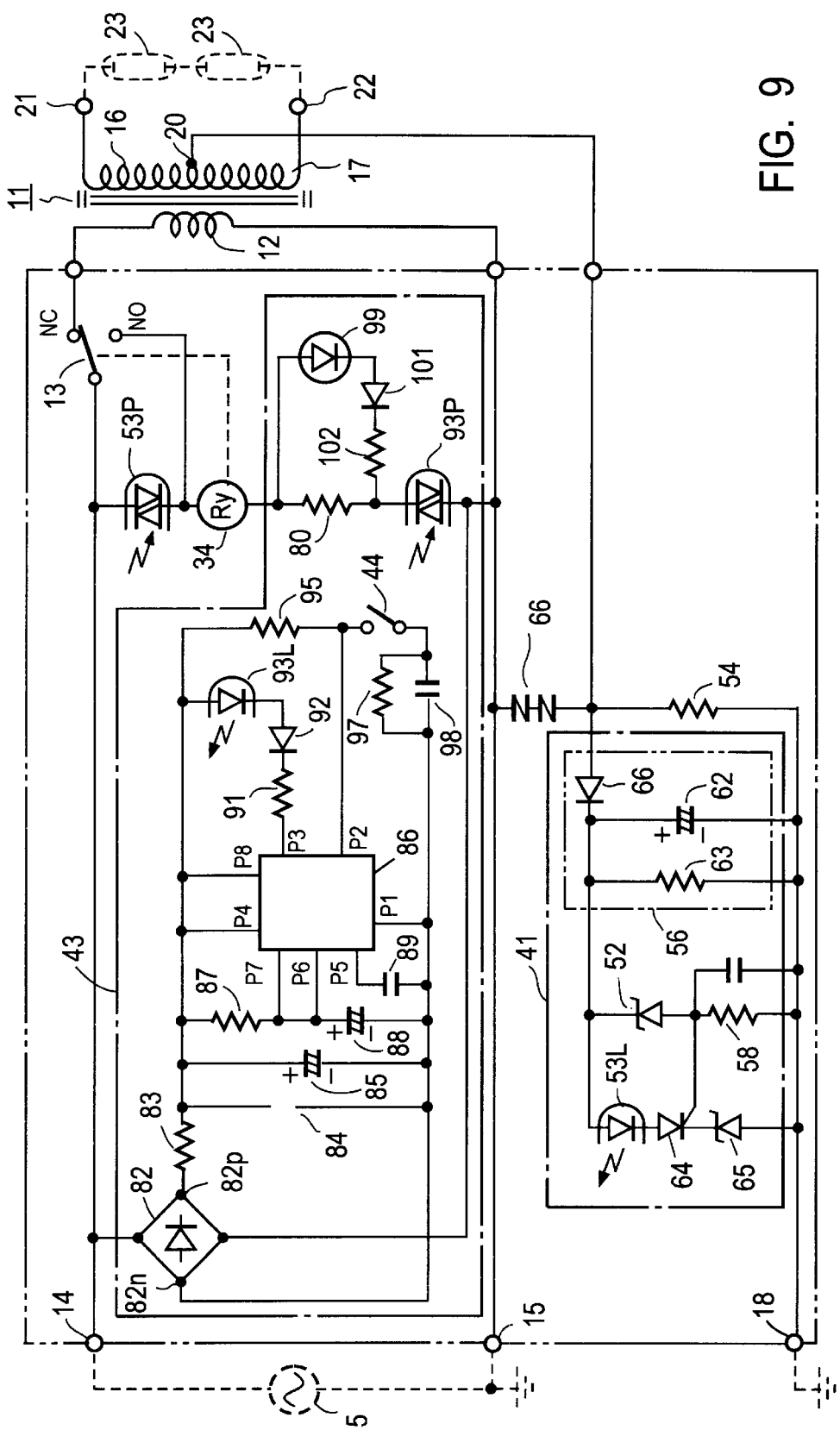
FIG. 9 is a circuit diagram showing an embodiment including a ground fault protective circuit and a stop circuit therefor.

In consideration of this, a ground fault protection stop circuit 43 is provided as mentioned previously in connection with FIG. 2. An embodiment of the ground fault protection stop circuit 43 is shown in FIG. 9. It is to be noted that in FIG. 9, parts corresponding to those shown in FIGS. 3 and 6 are designated by like reference numerals as used before. In the ground fault protection stop circuit 43, a fill wave rectifier circuit 82 is connected across power input terminals 14 and 15 and has output ends 82p and 82n, across which a parallel circuit of a Zener diode 84 and a capacitor 85 is connected through a resistor 83. Constant voltage of 12V, for example, is provided across the Zener diode 84, with the positive output being connected to an operating supply terminal P8 and a reset terminal P4 of a timer 86 and the negative output 82n being connected to a ground terminal P1. The timer 86 may comprise a linear IC M51848 manufactured by Mitsubishi Electric Company, for example. A series circuit of a resister 87 and a capacitor 88 is connected in shunt with the capacitor 85, and the junction between the resister 87 and capacitor 88 is connected to a threshold terminal P6 and a discharge terminal P7 of the timer 86. It is to be noted that the capacitor 88 is connected to the negative output 82n. A capacitor 89 is connected between a reference voltage terminal P5 of the timer 86 and the negative output 82n. The timer 86 has an output terminal P3 which is connected to the positive output 82p through a resister 91, a diode 92, a light emitting element 93L of an photocoupler 93 and the resister 83. A junction between the resister 83 and the light emitting element 93L is connected through a resister 95 to a trigger terminal P2 of the timer 86, and the trigger terminal P2 is connected to the negative output 82n through a ground fault protection stop switch 44 and a parallel circuit comprising a resister 97 and a capacitor 98.

The photocoupler 93 also includes a light receiving element 93P, which is connected in series with the relay drive coil 34. A series circuit including a light emitting diode 99, a diode 101 and a resister 102 is connected across a resister 80.

Figure 10:
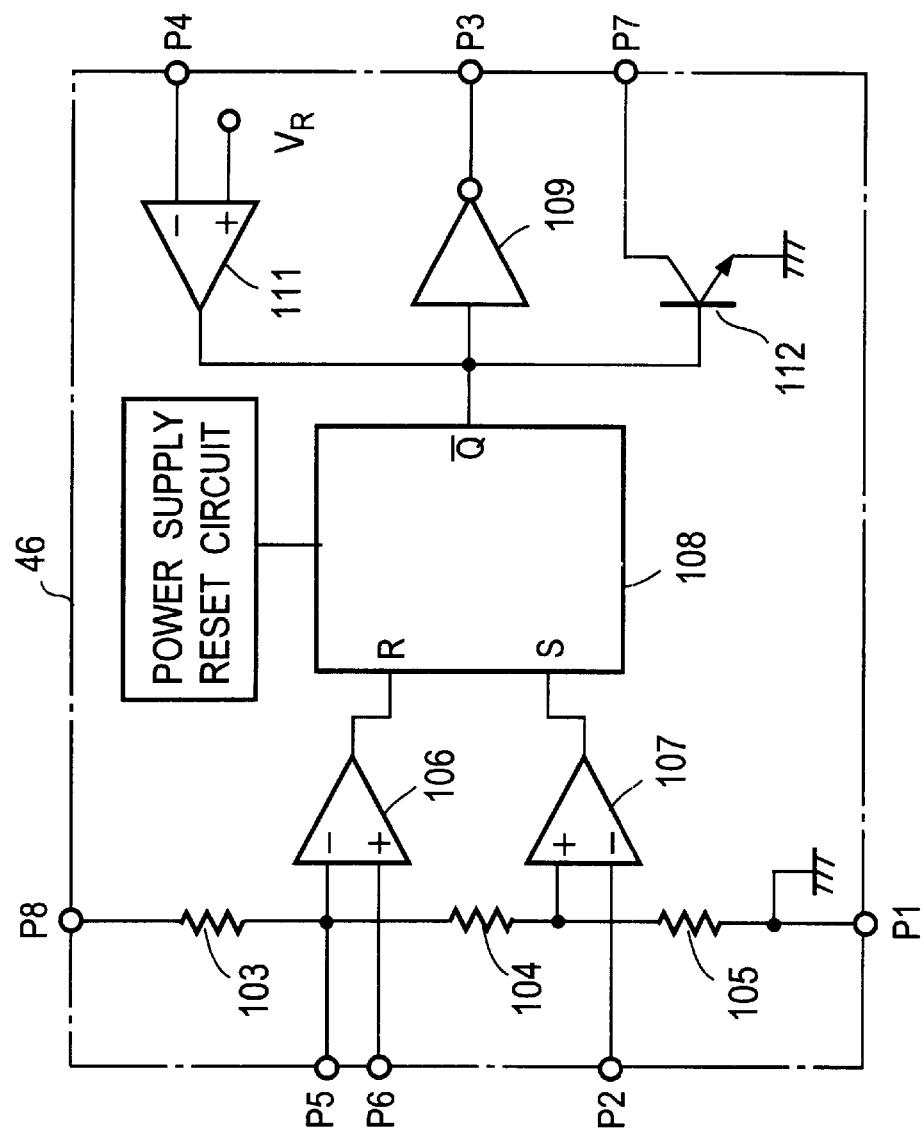
FIG. 10 is a circuit diagram showing an equivalent circuit of a timer 86 shown in FIG. 9.

The functional arrangement of the timer 86 is as shown in FIG. 10. Specifically, a series circuit including resistive elements 103, 104 and 105 having an equal resistance is connected between the power supply terminal P8 and the ground terminal P1, with the junction between the resistive elements 103 and 104 connected to the reference voltage terminal P5 and also connected to an inverting input terminal of a voltage comparator 106, the voltage comparator 106 having a non-inverting input terminal which is connected to the threshold terminal P6, with a junction between the resistive elements 104 and 105 being connected to a non-inverting input terminal of another voltage comparator 107, the voltage comparator 107 having an inverting input terminal which is connected to the trigger terminal P2, with the output terminals of the voltage comaprators 106 and 107 being connected to the reset terminal and the set terminal of a flipflop 108, the flipflop 108 having an inverted output terminal which is connected through a polarity inverting output stage 109 to the output terminal P3, a further voltage comparator 111 which has its inverting input terminal connected to the reset terminal P4 and which has its non-inverting input terminal connected to receive a reference voltage $V_R$ having an output terminal which is connected to the input terminal of the output stage 109, and a transistor 112 having its collector connected to the discharge terminal P7 and its emitter connected to the ground and its base connected to the input terminal of the output states 109.

When an a.c. power is applied across the supply input terminal 14 and 15, it is fed to the transformer 11, and is also rectified by the rectifier circuit 82 to obtain a given voltage across the capacitor 85, which voltage is applied to the supply terminal of the timer 86 to make it operative. In the steady-state condition, the discharge transistor 112 within the timer 86 causes the capacitor 88 to be discharged, and the output from the output terminal P3 assumes a low level. Accordingly, the light emitting element 93L is rendered conductive to emit light, which is received by the corresponding light receiving element 93P to be rendered conductive. Accordingly, when a secondary ground fault occurs on the transformer 11, the thyristor 64 is rendered conductive, causing the light emitting element 53L to emit light, which in turn renders the light receive element 53P conductive to allow a current flow through the relay drive coil 34, whereupon the switch 13 is thrown to the normally open position NO, thus interrupting the supply of the a.c. power to the transformer 11, in the similar manner as shown in FIGS. 3 and 6. This condition is indicated by lighting of the light emitting diode 99.

When an inspecting personnel operates the ground fault protection stop switch 44 to assume its on condition under the condition that the supply of the a.c. power is interrupted by the action of the ground fault protective circuit, the trigger terminal P2 of the timer 86, which has been applied with a positive voltage, is now applied with a negative voltage, whereby the timer 86 is triggered to set the flipflop 108, the output terminal P3 then assuming a high level to stop the light emission from the light emitting element 93L, whereby the light receiving element 93P is rendered nonconductive and the current ceases to flow through the relay drive coil 34, and the switch 13 is thrown to the normally closed position NC, thus supplying the a.c. power to the transformer 11.

As a consequence, the ground current flows again through the location of the ground fault, and the ground fault voltage detection circuit 41 detects the voltage to render the thyristor 64 conductive, causing the light emitting element 53L to emit light to render the light receiving element 53P conductive. However, because the light receiving element 93P remains nonconductive, there is no current flow through the relay drive coil 34, thus maintaining the supply of the a.c. power. In this manner, the inspecting personnel is enabled to find out the location of the ground fault in a facilitated manner, relying on sparks or a smell of ozone which may be produced by the ground current.

On the other hand, as the output terminal P3 of the timer 86 assumes a high level, the internal discharge transistor 112 is rendered nonconductive, whereby the capacitor 88 begins to be charged with a time constant which is determined by its combination with the resister 87. When the voltage across the capacitor 88 reaches a threshold voltage which is determined by the voltage division ratio of the voltage dividing resistive elements 103, 104 and 105 within the timer 86, the flipflop 108 is reset, whereupon the output terminal P3 inverts to a low level while simultaneously rendering the internal discharge transistor 119 conductive, thus instantaneously discharging the capacitor 88. When the output terminal 83 assumes a low level, the light emitting element 93L emits light and the light receiving element 93P is rendered conductive. Because the light receiving element 53P is also conductive, there occurs a current flow through the relay drive coil 34, throwing the protective switch 13 to its normally open position NO to interrupt the supply of the a.c. power to the transformer 11.

Thus, when the ground fault protection stop switch 44 is operated, the a.c. power is supplied to the transformer 11, and when a length of time on the order of 30 minutes, for example, which is required for an inspecting personnel to locate the location of the ground fault passes, the function of the ground fault protective circuit is recovered, thus interrupting the supply of the a.c. power and avoiding any likelihood that a ground fault may result in a serious accident such as a fire. Preferably, the ground fault protection stop switch 44 is one which is turned on as long as it is depressed, and is recovered to its off condition as soon as the switch 44 is released. This is because the switch 44 is left on without the prevision of the parallel circuit comprising the resister 97 and the capacitor 98, the flip flop 107 remains set, and accordingly, the output terminal P3 cannot be returned to its low level. So it is preferred that the switch 44 be turned off when it is released. In the example shown in FIG. 9, the parallel circuit comprising the resister 97 and the capacitor 98 is connected in series with the switch 44, and thus if the switch 44 remains depressed, after a short time interval which is determined by the time constant of the resister 97 and the capacitor 98, the supply voltage is divided by the resisters 95 and 97 to be applied to the trigger terminal P2, whereby the output terminal P3 of the timer 86 returns to its low level after a given time interval.

Since the purpose of the ground fault protection stop circuit 43 is to prevent the supply of the a.c. power from being interrupted by the switch 13, what is required is to override (or stop) the function of driving the switch 13. Accordingly, the arrangement is not limited to the series connection of the light receiving element 93P with the relay drive coil 34, but it may be connected in series with the light emitting element 53L. Alternatively, in place of using the light emitting element 93L and the light receiving element 93P, a semiconductor switch, a mechanical switch or the like may be used to override the function of driving the switch 13. The ground fault protective circuit is not limited to the example shown, but any other form of ground fault protective circuit may be used.

Figure 11:
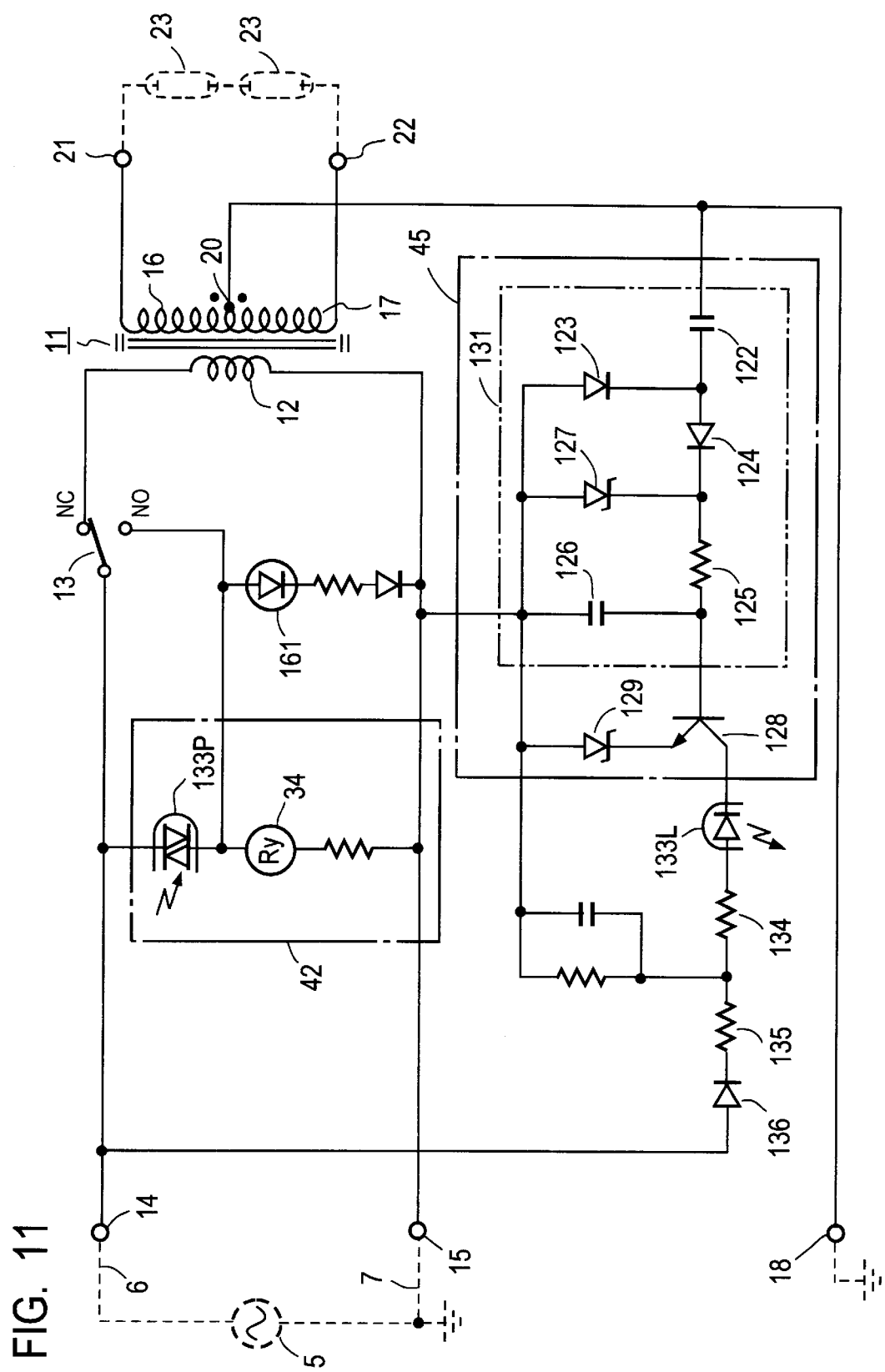
FIG. 11 is a circuit diagram showing an embodiment which is principally concerned with a no-ground terminal ground connection protective circuit shown in FIG. 2.

FIG. 11 shows an embodiment of the ground terminal no-ground connection protective circuit comprising no-ground connection voltage detection circuit 45 and the power supply interruption controller 42 shown in FIG. 2, and corresponding parts to those shown in FIG. 3 are designated by like reference numerals and characters as used before. In this embodiment, any voltage between a non-active line input terminal 15 and a ground terminal 18 which is equal to or above a given value is detected by the no-ground connection voltage detection circuit 45. Specifically, one end of a capacitor 122 is connected to the ground terminal 18 while its other end is connected to the cathode of a diode 123 and the anode of a diode 124. The cathode of the diode 124 is connected through a resistive element 125 to one end of a capacitor 126 while the anode of the diode 123 and the other end of the capacitor 126 are connected to the non-active line input terminal 15. As required, a junction between the diode 124 and the resistive element 125 is connected through a Zener diode 127 to the non-active line input terminal 15. The junction between the resistive element 125 and the capacitor 126 is connected to the base of a transistor 128 acting as an switching element, and the emitter of the transistor 128 is connected through a Zener diode 129 to the non-active line input terminal 15. It will be appreciated that the resistive element 125 and the capacitor 126 may be provided as required.

The circuit shown comprises a rectifier circuit having the capacitor 122 at its input. In the present example, the capacitors 122 and 126 and the diodes 123 and 124 form together a rectifier circuit 131. The transistor 128 is rendered conductive when a rectified output voltage from the rectifier circuit 131 exceeds a given value.

When a voltage equal to or above a given value is detected by the no-ground connection voltage detection circuit 45, the power supply interruption controller 42 operates to interrupt the supply of the a.c. power to the primary winding 12. The transistor 128 has a collector which is connected to an active line input terminal 14 through a light emitting element 133L of a photocoupler 133, resistive elements 134 and 135 and a protective diode 136. A series circuit comprising the light receiving element 133P of the photocoupler 133 and the relay drive coil 34 is connected between the active line input terminal 14 and the non-active line input terminal 15.

Magnetic circuits which are each formed by the secondary windings 16 and 17 of the transformer 17 are mutually unbalanced. They may be constructed in the similar manner as described above in connection with FIG. 7, for example.

In the described arrangement, when the ground terminal 18 is connected to the ground, a potential difference between the non-active line input terminal 15 and the ground terminal 18 is zero, and no voltage is detected by no-ground connection voltage detection circuit 45. Accordingly, the transistor 128 is nonconductive, there is no current flow through the relay drive coil 34, and the contact switch 13 is thrown to the normally closed position NC, whereby the a.c. power from the terminals 14 and 15 is supplied to the primary winding 12.

However, when the a.c. power is applied across the terminal 14 and 15 while the ground terminal 18 is not connected to the ground, the unbalance between the magnetic circuits formed by the secondary windings 16 and 17 causes a voltage to be developed at the junction 20 between the secondary windings 16 and 17 though of a very small magnitude, or a voltage is developed between the ground terminal 18 and the non-active line input terminal 15, and such voltage is detected by the no-ground connection voltage detection circuit 45. Thus, the voltage between the terminals 15 and 18 is rectified by the rectifier circuit 131, and a rectified output renders the transistor 128 conductive to pass a current through the light emitting element 133L to emit light, whereby the light receiving element 133P is rendered conductive to pass a drive current through the relay drive coil 34, thus throwing the contact switch 13 to the normally open position NO to interrupt the supply of the a.c. power to the primary winding 12. A self-holding current flows through the relay drive coil 34 to maintain this condition. Accordingly, if one intends to use the neon transformer while forgetting to connect the ground terminal 18 to the ground, the supply of the a.c. power is automaticaly interrupted to prevent the neon transformer from being used. In this instance, the light emitting element 133L, the resistive element 135 and the diode 136 form part of the power supply interruption controller 42 shown in FIG. 2.

Figure 12:
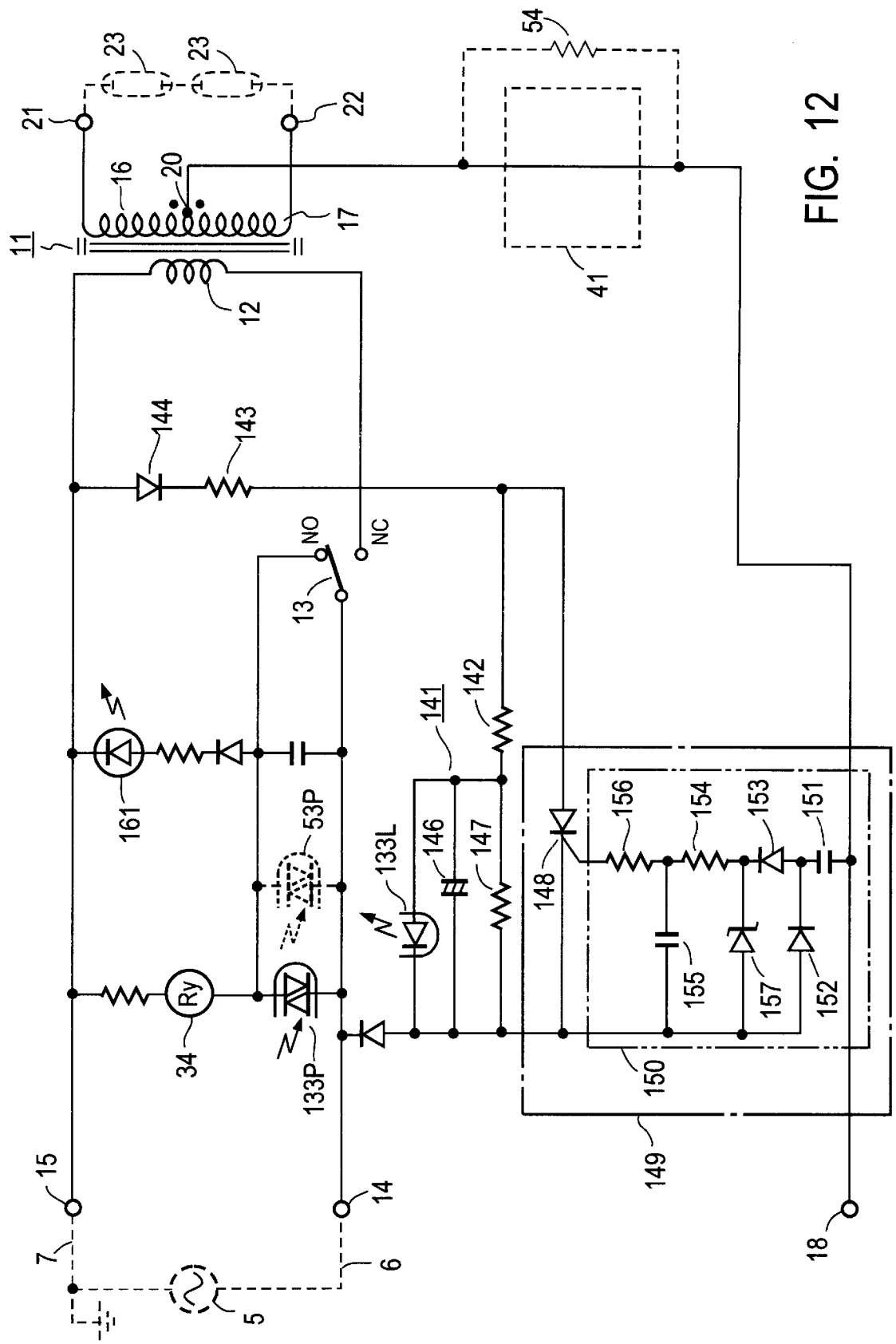
FIG. 12 is a circuit diagram of an embodiment which principally relates to a no-ground terminal ground connection protective circuit.

Referring to FIG. 12, another embodiment of the ground terminal no-ground connection protective circuit will be described. It is to be noted that corresponding parts to those shown in FIG. 11 are designated by like numerals and characters in FIG. 12 as used before.

In the present embodiment, a power application detection circuit 141 which forms part of the power supply interruption controller 42 is connected between an active line terminal 14 and a non-active line terminal 15 for detecting the application of an a.c. power across the terminals 14 and 15. Specifically, a photocoupler 133 has a light emitting element 133L, one end of which is connected to the non-active line terminal through resistive elements 142 and 143 and a protective diode 144 while the other end is connected to the active line input terminal 14 through a diode 145. As required, a capacitor 146 and a resistive element 147 are connected in shunt with the light emitting element 133L. In this manner, upon application of the a.c. power across the terminals 14 and 15, a light emission from the light emitting element 133L occurs.

A no-ground connection voltage detection circuit 149 is connected between the active line input terminal 14 and a ground terminal 18. Specifically, a thyristor 148 acting as a switching element is connected in shunt with the voltage application detection circuit 141. The thyristor 148 has its anode connected to the junction between the resistive elements 142 and 143 and has its cathode connected to the junction between the light emitting element 133L and the diode 145. A capacitor 151 has its one end connected to the ground terminal 18 while its other end is connected to the cathode of the diode 152 and the anode of a diode 153, the cathode of which is connected through a resistive element 154 to one end of a capacitor 155. The anode of the diode 152 and the other end of the capacitor 155 are connected to the cathode of the thyristor 148, and a junction between the resistive element 154 and capacitor 155 is connected through a resistive element 156 to the gate of the thyristor 148. As required, a Zener diode 157 is connected in shunt with the diode 153 and the diode 152. Except for the thyristor 148, the no-ground connection voltage detection circuit 149 forms a rectifier circuit 150 having the capacitor 151 at its input. In the present example, the rectifier circuit 150 is formed by the capacitors 151, 155 and the diodes 152 and 153. When a rectified output voltage from the rectifier circuit 150 exceeds a given value, the thyristor 148 is rendered conductive, overriding the function of the voltage application detection circuit 148. In the present instance, the transformer 11 used has magnetic circuits each formed by the secondary windings 16 and 17 which are mutually balanced.

In the described arrangement, when the ground terminal 18 is connected to the ground, a potential difference is produced between the ground terminal 18 and the active line input terminal 14 during a negative half-cycle of the input a.c. power, and is detected by the no-ground connection voltage detection circuit 149 to render the thyristor 148 conductive, whereupon the light emitting element 133L and the resistive element 142 are shorted by the conductive thyristor 148, thus overriding the function of the power application detection circuit 141 which forms part of the power supply interruption controller 42. Accordingly, if the a.c. power is applied across the terminals 14 and 15, the power application detection circuit 141 has its function overridden, and hence there occurs no light emission from the light emitting element 133L. During a positive half-cycle of the input a.c. power, the light emitting element 133L and the thyristor 148 are of opposite polarities, and the light emitting element 133L does not emit light even though the thyristor 148 is rendered nonconductive.

When the ground terminal 18 is not connected to the ground, there is no potential difference between the ground terminal 18 and the active line input terminal 14 which is large enough to allow the thyristor 148 to conduct, and accordingly there is no rectified output from the no-ground connection voltage detection circuit 149 and the thyristor 148 remains nonconductive. Accordingly, during negative half- cycle of the input a.c. power, there occurs a current flow from the non-active line input terminal 15 to the active line input terminal 14 through a path including the diodes 144 and 145, the light emitting element 133L and the resistive 142 and 143, allowing the light emitting element 133L to emit light. Thus, the application of the power across the terminals 14 and 15 is detected, and the light receiving element 133P is rendered conductive to pass an energizing current flows through the relay drive coil 34 to throw the contact switch 13 to the normally open position NO to interrupt the supply of the a.c. power to the primary winding 12. This condition is maintained by the self-holding circuit for the relay drive coil 34. In the present example, there is a current flow through a light emitting diode 161 through the normally open position NO of the switch 13, and the light emission from the light emitting diode 161 annunciates that the supply of the a.c. power is interrupted.

If the active line input terminal 14 is connected to a non-active line 7 and a non-active line input terminal 15 is connected to a active line 6 by inadvertence, even if the ground terminal 18 is connected to the ground, there is no voltage developed between the active line input terminal 14 and the ground terminal 18, and thus the thyristor 148 remains nonconductive, and when the terminal 15 assumes positive, a current flow through the light emitting element 133L causes it to emit light, which renders the light receiving element 133P conductive to pass a energizing current through the relay drive coil 34, turning the switch 13 off to interrupt the supply of the a.c. power. Thus , a reverse connection of the input terminals 14 and 15 with the a.c. supply 5 blocks the supply of the a.c. power to the transformer 11, and this is annunciated by the light emission from the light emitting diode 161.

If the ground terminal 18 is not connected to the ground together with the reverse connection, no voltage is developed between the terminals 14 and 15, and thus the thyristor 148 remains nonconductive. When the terminal 15 assumes positive, the light emission from the light emitting element 133l renders the light receiving element 133P conductive to pass an energizing current through the relay drive coil 34 to interrupt the supply of the a.c. power.

In the arrangements of FIGS. 3 and 11, a light emitting diode 161 may be connected in shunt with the relay drive coil 34 in the similar manner as shown in FIG. 12, thus annunciating the interruption of the supply of the a.c. power by the light emission thereof.

In each of the described embodiments, the relay may be replaced by a semiconductor switching element such as triac to control the supply or interruption of the a.c. power. In such instance, a ground fault voltage detection circuit 41 may be provided between the junction 20 and the ground terminal 18 as shown in broken lines in FIG. 12 to provide a ground fault protection. If required, a resistive element 54 is connected in shunt with the circuit 41.

As discussed above, in accordance with the invention, the interruption of the supply of the a.c. power can be achieved with a relatively small number of parts and a relatively simple arrangement when using a neon transformer while the ground terminal remains unconnected to the ground or during the reverse connection of the input terminals.

Accordingly, if the ground fault protective circuit is used in combination with one or more of a circuit which stops the function of the protective circuit or a ground terminal no-ground connection protective circuit in a manner shown in FIG. 2, a raceway which is used in the prior art when not employing such protective circuit may be used as a raceway (which is a metallic box which contains the neon transformer 11 when actually using it outdoors), the raceway containing all of these protective circuits.

What is claimed is:

1. A ground fault protective circuit for detecting a ground connection of a wiring or a load in circuits of secondary windings of a neon transformer, comprising;
   a first and a second input terminal to which an AC power supply is connected;
   a ground fault voltage detection circuit connected between a neutral point of the secondary windings and a ground terminal of the transformer which is non-responsive to a normal voltage appearing at the neutral point with respect to a ground potential at the ground terminal when the transformer is operated in a normal condition but is responsive to a fault voltage appearing at the neutral point and exceeding the normal voltage when the transformer is operated in an abnormal condition due to occurrence of said ground connection for generating a fault detection output indicating the occurrence of the ground connection in response to the fault voltage; and
   a power supply interrupter connected between the first and second input terminals and opposite ends of a primary winding of the transformer and controlled by the fault detection output from the ground fault voltage detection circuit to interrupt the supply of the AC power from the AC power supply to the primary winding, wherein
      said normal voltage appearing at the neutral point when the transformer is operated in the normal condition is close to the ground potential.

2. A ground fault protective circuit according to claim 1 in which the ground fault voltage detection circuit comprises:
   a switching element connected between the neutral point and the ground terminal, and
   a thresholding element which detects whether a voltage appearing at the neutral point with respect to the ground potential at the ground terminal exceeds the normal voltage appearing at the neutral point when said transformer is in the normal condition for turning the switching element in its ON state upon detection of the voltage at the neutral point in excess of the normal voltage.

3. A ground fault protective circuit for detecting a ground connection of a wiring or a load in circuits of secondary windings of a neon transformer, comprising;
   a first and a second input terminal connected to opposite ends of a primary winding of the transformer and adapted to be connected to an a.c. power supply;
   a ground fault voltage detection circuit connected between a neutral point of the secondary windings and a ground terminal of the transformer for detecting a fault voltage appearing due to said ground connection between the neutral point and the ground terminal which is larger than a normal voltage of a value appearing between the neutral point and the ground terminal when no ground connection occurs;
   a power supply interrupter connected with the first and second input terminals and controlled by a detection output indicative of detection of the fault voltage from the ground fault voltage detection circuit to interrupt the supply of the a.c. power from the a.c. power supply to the primary winding; and
   the ground fault voltage detection circuit including a switching element connected between the neutral point and the ground terminal, and a thresholding element for turning the switching element on when the voltage between the neutral point and the ground terminal becomes equal to or above the given value; and
   the ground fault voltage detection circuit having a rectifier circuit connected between the neutral point and the ground terminal for rectifying a voltage developed therebetween for application to the thresholding element.

4. A ground fault protective circuit for detecting a ground connection of a wiring or a load in circuits of secondary windings of a neon transformer, comprising;
   a first and a second input terminal connected to opposite ends of a primary winding of the transformer and adapted to be connected to an a.c. power supply;
   a ground fault voltage detection circuit connected between a neutral point of the secondary windings and a ground terminal of the transformer for detecting a fault voltage appearing due to said ground connection between the neutral point and the ground terminal which is larger than a normal voltage of a value appearing between the neutral point and the ground terminal when no ground connection occurs;
   a power supply interrupter connected with the first and second input terminals and controlled by a detection output indicative of detection of the fault voltage from the ground fault voltage detection circuit to interrupt the supply of the a.c. power from the a.c. power supply to the primary winding; and
   the ground fault voltage detection circuit including a switching element connected between the neutral point and the ground terminal, and a thresholding element for turning the switching element on when the voltage between the neutral point and the ground terminal becomes equal to or above the given value; and
   the power supply interrupter having a light emitting element of a photocoupler which is connected in series with a switching element, a series circuit connected between the first and the second input terminal and including a light receiving element of the photocoupler and the relay drive coil, and the relay switching contact which is driven by the relay drive coil and connected in series between the first input terminal and an end of the primary winding to be turned off while forming a relay self-holding circuit which maintains the off condition.

5. A ground fault protective circuit for detecting a ground connection of a wiring or a load in circuits of secondary windings of a neon transformer, comprising;
   a first and a second input terminal connected to opposite ends of a primary winding of the transformer and adapted to be connected to an a.c. power supply;
   a ground fault voltage detection circuit connected between a neutral point of the secondary windings and a ground terminal of the transformer for detecting a fault voltage appearing due to said ground connection between the neutral point and the ground terminal which is larger than a normal voltage of a value appearing between the neutral point and the ground terminal when no ground connection occurs;

a power supply interrupter connected with the first and second input terminals and controlled by a detection output indicative of detection of the fault voltage from the ground fault voltage detection circuit to interrupt the supply of the a.c. power from the a.c. power supply to the primary winding; and the neon transformer has a pair of secondary windings each forming a magnetic circuit, the two magnetic circuits having mutually unbalanced magnetic characteristics.

6. A ground fault protective circuit according to claim 5 in which a pair of leakage cores form part of the pair of magnetic circuits of the transformer, the leakage cores having mutually different flux leakage characteristics to provide the unbalance.

7. A ground fault protective circuit for detecting a ground connection of a wiring or a load in circuits of secondary windings of a neon transformer, comprising;

a first and a second input terminal connected to opposite ends of a primary winding of the transformer and adapted to be connected to an a.c. power supply;

a ground fault voltage detection circuit connected between a neutral point of the secondary windings and a ground terminal of the transformer for detecting a fault voltage appearing due to said ground connection between the neutral point and the ground terminal which is larger than a normal voltage of a value appearing between the neutral point and the ground terminal when no ground connection occurs;

a power supply interrupter connected with the first and second input terminals and controlled by a detection output indicative of detection of the fault voltage from the ground fault voltage detection circuit to interrupt the supply of the a.c. power from the a.c. power supply to the primary winding; and a resistive element connected in shunt with the ground fault voltage detection circuit.

8. A ground fault protective circuit for detecting a ground connection of a wiring or a load in circuits of secondary windings of a neon transformer, comprising;

a first and a second input terminal connected to opposite ends of a primary winding of the transformer and adapted to be connected to an a.c. power supply;

a ground fault voltage detection circuit connected between a neutral point of the secondary windings and a ground terminal of the transformer for detecting a fault voltage appearing due to said ground connection between the neutral point and the ground terminal which is larger than a normal voltage of a value appearing between the neutral point and the ground terminal when no ground connection occurs;

a power supply interrupter connected with the first and second input terminals and controlled by a detection output indicative of detection of the fault voltage from the ground fault voltage detection circuit to interrupt the supply of the a.c. power from the a.c. power supply to the primary winding;

a ground fault protection stop switch; and a ground fault protection stop circuit connected between the first and the second input terminal and also connected to a ground fault protection stop switch to override the protective function of the ground fault protective circuit when the switch is operated.

9. A ground fault protective circuit according to claim 8, in which the ground fault protection stop circuit comprises a timer which starts upon operation of the ground fault protection stop switch, and interruption stop means which overrides the function of the power supply interrupter to interrupt the supply of the a.c. power during the operation of the timer.

10. A ground fault protective circuit according to claim 9 in which the first input terminal and the second input terminal are adapted to be connected with an active line and a non-active line of an a.c. power supply, respectively, the secondary winding of the transformer having a neutral point, the secondary winding portions located on the opposite side of the neutral point forming a pair of magnetic circuits having magnetic characteristics which are mutually unbalanced, further comprising;

a no-ground connection voltage detection circuit connected between the ground terminal and the second input terminal for detecting a voltage between the ground terminal and the second input terminal; and a controller for controlling the power supply interrupter in accordance with a voltage detection output from the no-ground connection voltage detection circuit.

11. A ground fault protective circuit for detecting a ground connection of a wiring or a load in circuits of secondary windings of a neon transformer, comprising;

a first and a second input terminal connected to opposite ends of a primary winding of the transformer and adapted to be connected to an a.c. power supply;

a ground fault voltage detection circuit connected between a neutral point of the secondary windings and a ground terminal of the transformer for detecting a fault voltage appearing due to said ground connection between the neutral point and the ground terminal which is larger than a normal voltage of a value appearing between the neutral point and the ground terminal when no ground connection occurs;

a power supply interrupter connected with the first and second input terminals and controlled by a detection output indicative of detection of the fault voltage from the ground fault voltage detection circuit to interrupt the supply of the a.c. power from the a.c. power supply to the primary winding;

the first input terminal and the second input terminal adapted to be connected with an active line and a non-active line of an a.c. power supply, respectively, the secondary winding portions located on the opposite sides of the neutral point forming a pair of magnetic circuits having magnetic characteristics which are mutually unbalanced;

a no-ground connection voltage detection circuit connected between the ground terminal and the second input terminal for detecting a voltage between the ground terminal and the second input terminal; and a controller for controlling the power supply interrupter in accordance with the voltage detection output from the no-ground connection voltage detection circuit.

12. No-ground connection protective circuit for detecting a no-ground connection of a ground terminal of a neon transformer in which a junction between a pair of secondary windings on the neon transformer is connected with the ground terminal of the transformer or detecting a reverse connection of input terminals, comprising;

an active line input terminal and a non-active line input terminal connected to the opposite ends of a primary winding of the transformer, respectively, and adapted to the connected to an active line and a non-active line of an a.c. power supply, respectively;

a pair of magnetic circuits each formed by one of the pair of secondary windings of the neon transformer and having magnetic characteristics which are mutually unbalanced;

a no-ground connection voltage detection circuit connected between the non-active line input terminal and the ground terminal of the transformer for detecting the voltage between the non-active line input terminal and the ground terminal; and power supply interrupter connected between the active line input terminal and the non-active line input terminal and controlled by a voltage detection output from the no-ground connection voltage detection circuit for interrupting the supply of the a.c. power from the a.c. power supply to the primary winding.

13. A no-ground connection protective circuit according to claim 12 in which the no-ground connection voltage detection circuit comprises a rectifier circuit having a capacitor at its input which is connected to the ground terminal and a switching element fed with a rectified output from the rectifier circuit to be rendered conductive when the rectfied output is equal to or above a given value, the switching element controlling the power supply interrupter by its conduction.

14. A no-ground connection protective circuit for detecting a no-connection with the ground of a ground terminal of a neon transformer in which a junction between a pair of secondary windings on the neon transformer is connected with the ground terminal of the transformer or detecting a reverse connection of input terminals, comprising an active line input terminal and a non-active line input terminal connected to the opposite ends of a primary windings of the transformer, respectively, and adapted to be connected to an active line and a non-active line of an a.c. power supply;

a power application detection circuit connected between the active line input line and the non-active line input terminal for detecting the application of the a.c. power between the active line input terminal and the non-active line input terminal;

a power supply interrupter connected between the active line input terminal and the non-active line input terminal and controlled by an output from the power application detection circuit representing the application of the power for interrupting the supply of the a.c. power to the primary winding; and a no-ground connection voltage detection circuit connected to the active line input terminal and the ground terminal for detecting a voltage between the ground terminal and the active line input terminal to override the function of the power application detection circuit in response to a detection output.

15. A no-ground connection protective circuits according to claim 14 in which the no-ground connection voltage detection circuit comprises a rectifier circuit having its input connected to the ground terminal and including a capacitor at its input, and a switching element connected in shunt with the voltage application detection circuit and including a control electrode which is fed with a rectified output from the rectifier circuit to be turned on when the rectified output is equal to or above a given value.

16. A ground fault protective circuit for detecting the occurrence of a ground fault of a wiring of or a load on a secondary winding on a neon transformer for interrupting the supply of an a.c. power to a primary winding of the neon transformer, comprising;

a first and a second input terminal connected to the opposite ends of the primary winding of the transformer, respectively, and adapted to be connected across an a.c. power supply;

a ground fault protection stop switch; and a ground fault protection stop circuit connected between the first and the second input terminal and also connected to a ground fault protection stop switch to override the protective function of the ground fault protective circuit when the switch is operated.

17. A ground fault protective circuit according to claim 16 in which the ground fault protection stop circuit comprises a timer which starts when the ground fault protection stop switch is operated, and interruption stop means for overriding the function of the ground fault protection stop circuit to interrupt the supply of the a.c. power during the operation of the timer.

18. A neon sign circuit for lighting neon tubes comprising:

a high voltage transformer having a ground terminal, a primary winding to which A.C. power is supplied and a pair of secondary windings generating a high voltage thereacross, respective first terminals of the secondary windings being connected together to form a neutral point and the other terminals of the respective secondary windings being connected to the neon tubes to be lighted, a ground fault voltage detection circuit detecting a ground fault which occurs when wires connecting the secondary windings to the neon tubes or the neon tubes accidentally contact ground, the detection circuit generating a detection signal indicative of the occurrence of the ground fault upon detection of a ground fault, and a power supply interruption controller having a switch and means for controlling said switch in its closed state when the neon sign circuit is under normal condition and turning said switch to its open state to interrupt supply of the power to the transformer in response to the detection signal generated by the ground fault detection circuit, wherein said ground fault voltage detection circuit comprises:

a rectifier circuit having a pair of input terminals, one of which is connected to the neutral terminal of the secondary windings and the other of which is connected to the ground terminal of said transformer, and rectifying an A.C. voltage appearing between said pair of input terminals to thereby obtain a rectified D.C. voltage corresponding to said A.C. voltage;

a switching element having on and off states;

a thresholding element having a threshold value for turning said switch means to its on or off state whether the D.C. voltage obtained from said rectifier circuit exceeds said threshold value or not, respectively, said threshold value being predetermined to be larger than the D.C. voltage of a maximum value when said neon sign circuit is under its normal condition but smaller than the D.C. voltage of a value when said ground fault occurs; and means for transmitting the detection signal responsive to the on state of said switching element to said power supply interruption controller to thereby cause said switch to its open state.

* * * * *